United States Patent
Hamidi et al.

(10) Patent No.: US 9,509,705 B2
(45) Date of Patent: Nov. 29, 2016

(54) AUTOMATED SECONDARY LINKING FOR FRAUD DETECTION SYSTEMS

(71) Applicant: Wells Fargo Bank, N.A., San Francisco, CA (US)

(72) Inventors: Sean S. Hamidi, Lafayette, CA (US); Beth S. Moss, Danville, CA (US); Jason M. Stokes, Los Angeles, CA (US); Ryan S. Alexander, Mill Creek, WA (US); Wendy M. Stutz, SLC, UT (US); Angela C. Berkery, Sandy, UT (US); Benjamin W. Geertz, Milwaukie, OR (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/453,988

(22) Filed: Aug. 7, 2014

(65) Prior Publication Data

US 2016/0044048 A1   Feb. 11, 2016

(51) Int. Cl.
*H04L 29/06* (2006.01)

(52) U.S. Cl.
CPC .................................... *H04L 63/14* (2013.01)

(58) Field of Classification Search
CPC .................. G06F 21/6245; G06F 2221/2141; G06F 21/6209; G06F 21/577; G06F 21/56; H04L 63/1416; H04L 63/1408
USPC .......... 726/11–14, 22–25; 713/170, 182, 189, 713/193; 709/224–225; 705/14.26, 14.47, 705/318
See application file for complete search history.

(56) References Cited

U.S. PATENT DOCUMENTS

| | | | | |
|---|---|---|---|---|
| 8,695,097 | B1 * | 4/2014 | Mathes | H04L 63/08 726/25 |
| 8,856,923 | B1 * | 10/2014 | Kolman | G06Q 20/4016 380/255 |
| 2006/0277141 | A1 * | 12/2006 | Palmer | G06Q 40/02 705/38 |
| 2007/0174214 | A1 * | 7/2007 | Welsh | G06Q 40/02 705/405 |
| 2007/0220604 | A1 * | 9/2007 | Long | G06F 21/55 726/22 |
| 2008/0208760 | A1 * | 8/2008 | Keithley | G06Q 20/04 705/75 |
| 2009/0157675 | A1 * | 6/2009 | Stellhorn | G06Q 10/107 |
| 2009/0164232 | A1 * | 6/2009 | Chmielewski | G06Q 30/0185 705/318 |
| 2010/0314441 | A1 * | 12/2010 | Papierniak | G06Q 40/08 235/375 |
| 2013/0263211 | A1 * | 10/2013 | Neuman | H04L 63/08 726/1 |
| 2014/0108251 | A1 * | 4/2014 | Anderson | G06Q 20/4016 705/44 |

* cited by examiner

*Primary Examiner* — Shanto M Abedin
(74) *Attorney, Agent, or Firm* — Walter | Haverfield LLP; James J. Pingor

(57) ABSTRACT

Systems, methods, and other embodiments associated with automated secondary linking for fraud detection systems. According to one embodiment, a system includes a parsing logic configured to receive an incoming fraud report based on a first fraud detection strategy. The parse logic is also configured to parse the incoming fraud report into fraud data. The system further includes a search logic configured to search a set of fraud reports to identify instances of the fraud data. The system also includes an alert logic configured to generate an alert in response to an instance of the fraud data being identified in the set of fraud reports.

18 Claims, 7 Drawing Sheets

AUTOMATED SECONDARY LINKING FOR FRAUD DETECTION SYSTEMS

BACKGROUND

Online transactions are becoming a primary way to conduct business. For example, individuals and corporate entities are increasingly conducting their financial affairs using online banking tools. Organizations that offer the ability to perform transactions online often manage massive amounts of data. For example, organizations maintain data regarding the types of transactions, participants in the transactions, details about the computers being used by the participants to perform the transactions, and so on.

However, online transactions also create new and extensive opportunities for fraud. As one example, a fraudster may attempt to open numerous bank accounts with fake or stolen identity information. Fake identity information can be created with relative ease (e.g., signing up for free email addresses). Additionally, identity information is routinely stolen. Thus, even if only one fraudulent attempt succeeds, the fraud is generally still profitable due to the ease and low cost of obtaining fake or stolen identity information.

Moreover, fake and/or stolen identity information can be easily discarded. For example, if one email address is identified as having been used for fraud, the fraudster may maintain the fake identity and replace only the identified email address. Therefore, the fraudster can continue to perpetrate fraud with very little inconvenience to himself despite the email having been identified as fraudulent. Alternatively, if the identity of a fraudster is deemed fraudulent, the fraudster may use the fraudulent identity to target a different organization (e.g., financial institution) or even a different branch of the same organization.

Organizations have developed a number of strategies to detect and mitigate fraud. These fraud detection strategies attempt to detect fraudulent activity by identifying suspicious or incongruent information in the massive amounts of data that the organization maintains. This can be as difficult as locating the proverbial needle in a haystack. Moreover, the fraud detection strategies are typically utilized as insular approaches. For example, the information discovered as a result of one fraud detection strategy is not applied to other aspects of an organization (e.g., branches, departments, accounts) or the organization's other fraud detection strategies. Because the fraud detection strategies do not benefit from information identified as a result of other fraud detection strategies, the fraud detection strategies redundantly identify fraudulent activity. This redundancy wastes time and resources. Alternatively, the other fraud detection strategies may not even discover the information, thereby allowing different but related frauds to be perpetrated. Thus, the fraud detection strategies are underutilized making the fraud detection strategies less effective.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, organizations, such as financial institutions, have developed a number of methodologies designed to identify and mitigate fraudulent activity. These methodologies are referred to, herein, as fraud detection strategies. Once a fraud detection strategy identifies a potential threat of fraud, a fraud report is generated so that the threat can be reviewed. The fraud report details information about the assets, entities, individuals, and/or organizations related to the potential threat. The fraud report can then be reviewed to determine if fraudulent activity has taken place.

Described herein are examples of systems, methods, and other embodiments associated with automated secondary linking for fraud detection systems. The systems, methods, and other embodiments described herein use the fraud reports to generate fraud data. The fraud data is then utilized to determine whether instances of the fraud data occur in other fraud reports. While fraud detection strategies may be the primary method of fraud detection, using fraud data provides a secondary link to possible fraud. Specifically, fraud data links fraud reports to one another to reveal patterns of fraud. Accordingly, fraud data does not have to be redundantly generated from the fraud reports of multiple fraud detection strategies. Instead, fraud data generated based on one fraud detection strategy is used by other fraud detection strategies so that potential threats are not overlooked.

In one embodiment, a fraud detection strategy may attempt to identify accounts being used for trafficking of illegal goods by identifying characteristics typical in illegal trafficking situations. For example, one characteristic of illegal trafficking is holding a joint account has account owners that reside in different states. If such a joint account is identified, a fraud report is generated so the account can be reviewed for fraudulent activity. The fraud report may contain information that identifies the account owners (e.g., name, email address, social security number, phone number).

As described in detail below, the fraud report is received and parsed to process the information of the fraud report. In one embodiment, parsing the information of the fraud report includes separating the information into categories to generate fraud data. Other fraud reports are then searched to identify instances of the fraud data. By identifying additional instances of the fraud data, a secondary link to fraud is provided. The secondary links to fraud identify patterns in fraudulent behavior.

Additionally or alternatively, consider that a first fraud detection strategy results in a fraud report and the fraud report data is parsed from that fraud report. When a second fraud detection strategy is executed, the fraud data can be used as a searchable parameter. Consider that a second fraud detection strategy is designed to search through an organization's data to identify applicants that repeatedly apply for new accounts despite having been denied multiple times. Rather than searching through massive amounts of data using typical searching conventions (e.g., alphabetical order, chronological order), fraud data may be prioritized. Accordingly, the information is searched for instances of the fraud data before the information is searched using a typical search convention.

For example, as discussed above, an individual may be identified as an account owner of a joint account in which the account owners reside in different states. When executing a second fraud detection strategy, the fraud data, including the identity of the account owners, is searched to determine if the account owners have also attempted to open new accounts after having been previously denied. Thus, the individuals who are identified in fraud data are searched before other individuals. The second fraud detection strategy is focused on identifying alternate fraud that may have been perpetrated by individual identified in the fraud data. Accordingly, fraud detection systems prioritize the fraud data to identify links between occurrences of fraud.

In addition to the fraud data being prioritized, the fraud data may be used to modify a fraud detection strategy. For example, the second fraud detection strategy may be modified to depend on the first fraud detection strategy. Suppose that the second fraud detection strategy defines a threshold. The threshold may be altered based on a result from the first fraud detection strategy. In one embodiment, the second fraud detection strategy may be designed to generate a fraud report when an applicant for an account has been denied on three previous occasions. However, if the applicant is also an account owner on a joint account in which the account owners live in different states, then the second fraud detection strategy may be designed to generate a fraud report when the applicant for an account has been denied on only two previous occasions. Therefore, the fraud detection strategies may be interdependent. Accordingly, an organization can limit its exposure to fraud by reducing threshold values when secondary links to potential fraud have been established.

By revealing secondary links to fraud, the fraud detection systems are capable of identifying fraudsters as well as patterns of fraudulent behavior. Further, less time and fewer resources are used to identify fraudulent behavior since it is unnecessary to redundantly identify information already discovered by another fraud detection strategy. Other aspects enable fraud detection strategies to be used in tandem with one another. Although the embodiments are described with respect to two fraud detection strategies, it will be appreciated that the fraud data may be processed from and used in conjunction with more or fewer fraud detection strategies.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
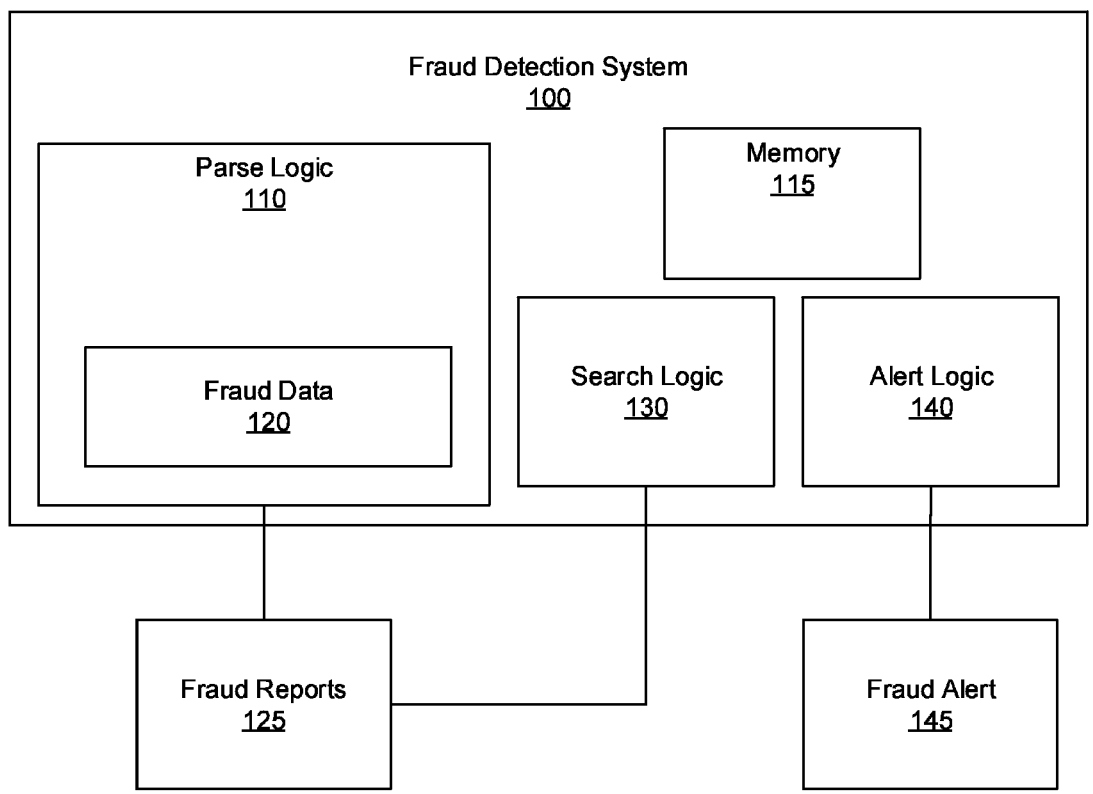
FIG. 1 illustrates one embodiment of a system associated with automated secondary linking for fraud detection systems.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art. Described herein are examples of systems, methods, and other embodiments associated with automated secondary linking for fraud detection systems.

FIG. 1 is an illustration of an example fraud detection system 100 associated with automated secondary linking. The fraud detection system 100 includes a parse logic 110, a search logic 130, and an alert logic 140. The parse logic 110 may be associated with a memory 115 configured to store fraud data 120. Additionally, the fraud detection system 100 may include a processor or a processing unit to support the parse logic 110, the search logic 130, and/or the alert logic 140. The fraud detection system 100 may be implemented in systems (not shown) used to detect fraudulent behavior affecting organizations (e.g., financial institutions, legal entities, universities). The systems used to detect fraudulent behavior generate fraud reports 125.

In the scenario described with respect to the fraud detection system 100, the parse logic 110 receives fraud reports 125. For purposes of explanation, the fraud reports 125 may be generated as the result of at least one fraud detection strategy. In one embodiment, the parse logic 110 is configured to interface with systems that generate the fraud reports 125. A fraud detection strategy is any methodology used to identify a potential threat for fraud. Particularly, a fraud detection strategy attempts to identify instances of fraud based on specific characteristics that are indicative of fraud. Alternatively, rather than attempting to pinpoint different types of fraud, the fraud reports 125 may be generated for all transactions given there is the possibility of fraud in any transaction. For example, an online transaction may cause fraud reports 125 to be generated.

A fraud report of the fraud reports 125 includes information regarding the potential threat of fraud so the account can be reviewed for fraudulent activity. For example, as discussed above, a fraud report may contain information that describes assets, entities, individuals, and/or organizations related to the potential threat. For example, if a fraud strategy is used to identify a risky account, the account owner's personal information (e.g., name, email address, social security number, phone number) as well as information about the count may be included in the fraud report.

The parse logic 110 parses the information from the fraud reports 125 to generate the fraud data 120. The fraud data 120 are discrete packets of information that identify features of a potential fraud. A fraud report of the fraud reports 125 may be parsed to generate the fraud data 120 based on information including: names, phone numbers, addresses, email addresses, computer cookie information from online banking sessions, internet protocol (IP) address from online banking sessions, and so on. In one embodiment, the fraud data 120 is stored in the memory 115.

The search logic 130 searches an organizations data to identify secondary links to fraud. Specifically, the search logic 130 uses the fraud data 120 to search the other fraud reports of the fraud reports 125 to determine if instances of the fraud data 125 occur elsewhere. Accordingly, if the fraud data 120 identifies an individual, other transactions involving that individual can also be identified. For example, once an account owner of a risky joint account is identified in the fraud data, other accounts can be searched to determine if the account owner holds any other accounts with the organization.

If the fraud data 120 is identified in another fraud report, for example, if the search logic 130 determines that the account owner does hold another account, the alert logic 140 generates a fraud alert 145 to indicate that an occurrence of the fraud data 120 has been identified. Thus, the alert logic 140 generates a fraud alert 145 when another instance of the fraud data 120 is identified by the search logic 130. A fraud alert 145 can then be reviewed to determine if fraudulent activity has taken place.

Figure 2:
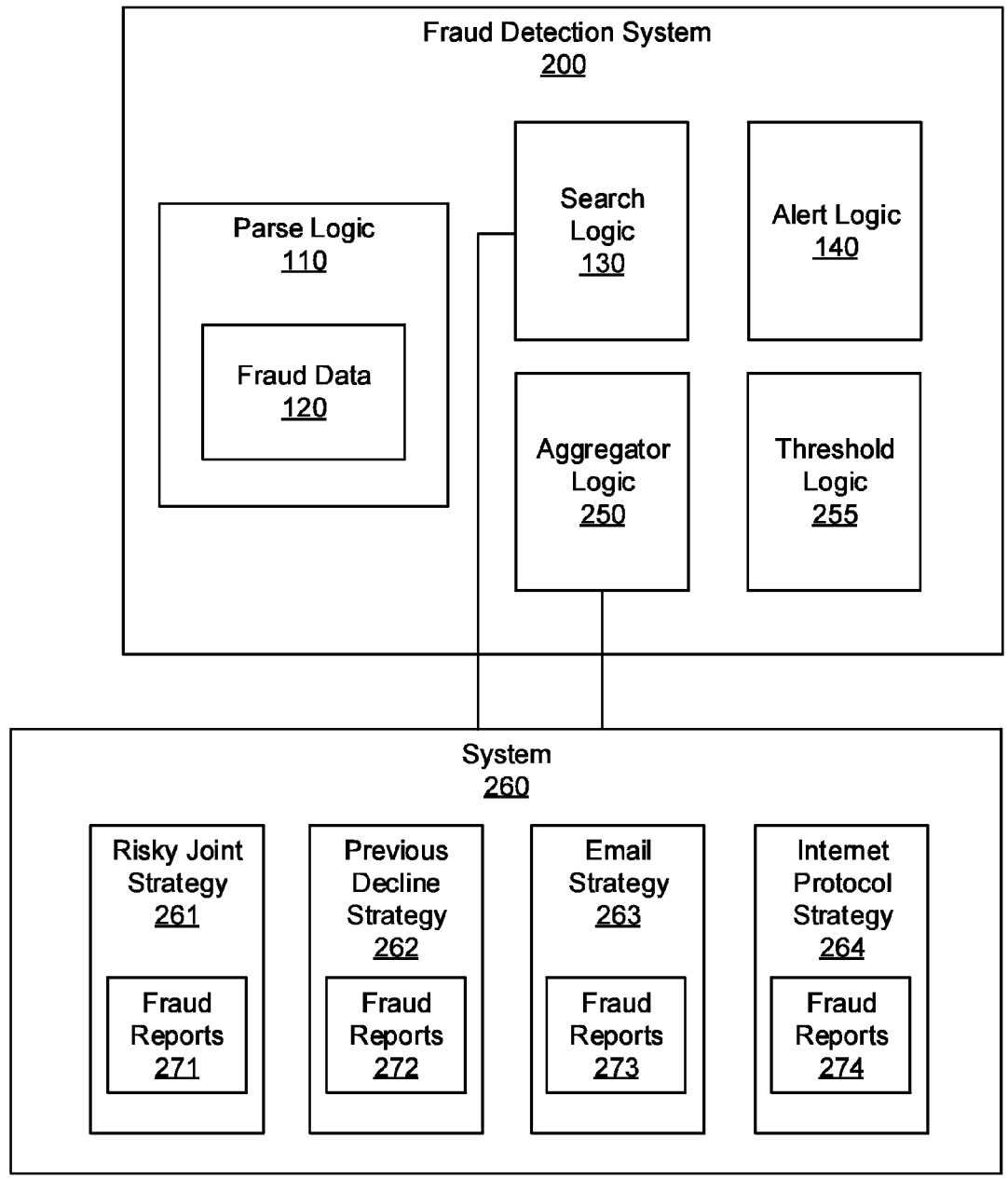
FIG. 2 illustrates one embodiment of a system having an aggregator logic and a threshold logic associated with automated secondary linking for fraud detection systems.

FIG. 2 is an illustration of one embodiment of a fraud detection system 200 having an aggregator logic 250 and a threshold logic 255 associated with automated secondary linking for fraud detection systems. The parse logic 110, the fraud data 120, the search logic 130, and the alert logic 140 operate in a similar manner as described above with respect to FIG. 1.

In the embodiment shown in FIG. 2, an aggregator logic 250 interfaces with system 260. The system 260 monitors fraud detection strategies including a risky joint strategy 261, a previous decline strategy 262, an email strategy 263, and an internet protocol (IP) strategy 264. The risky joint strategy 261 operates in the manner described above to identify joint account held by accounts owners that live in different states. The previous decline strategy 262 operates in the manner described above to identify applicants that have been declined on multiple previous occasions. The email strategy 263 identifies email addresses that have been used on multiple applications for different accounts. The IP strategy 264 identifies IP addresses that define a computer used to submit multiple applications. The fraud detection strategies may be executed as processes of a single system. Conversely, the fraud detection strategies 261-264 may be executed as processes over a number of systems.

Fraud detection strategies: the risky joint strategy 261, the previous decline strategy 262, the email strategy 263, and the internet protocol strategy 264 are included as examples. Additional fraud detection strategies may be used such as velocity origination or multi-link origination fraud detection. Velocity origination fraud detection strategies determine when multiple online applications are submitted using a device identified as having the same characteristics (e.g., email address, personal computer fingerprint, cookie) within a predetermined amount of time. For example, applications submitted for multiple individuals on the same device is identified as it is indicative of fraud. These examples are merely for purposes of explanation. Different fraud detection strategies may be employed in conjunction with the embodiments described herein.

The fraud detection strategies 261-264 result in corresponding fraud reports 271, 272, 273, and 274. The aggregator logic 250 monitors the fraud detection strategies 261-264 to determine if the fraud detection strategies 261-264 have resulted in new fraud reports. For example, if the previous decline strategy 262 results in a fraud report, the aggregator logic 250 retrieves the fraud report from the fraud reports 272. The aggregator logic 250 sends the fraud report to be received by the parse logic 110. Thus, the aggregator logic 250 monitors the fraud detection strategies 261-264 which may be executed separately according to different parameters and schedules. The aggregator logic 250 retrieves resulting fraud reports for the parse logic 110.

The threshold logic 255 sets a threshold for a fraud detection strategy. For example, a threshold value may be set such that an individual is identified when three of the individual's previous applications have been denied. Thus, the threshold logic 255 sets and maintains the threshold value to be equal to denial of three previous applications. The threshold logic 255 is also configured with the ability to modify a threshold value. In one embodiment, if an individual is identified in the fraud data parsed from a fraud report resulting from a first fraud detection strategy, a threshold value for a second fraud detection strategy is modified. For example, if the individual is identified by a first fraud detection strategy, a fraud report is generated for the second fraud detection strategy when an applicant for an account has been denied on only two previous occasions. Thus, the threshold logic 255 may modify a threshold value of one fraud detection strategy to make the fraud detection strategy dependent on another fraud detection strategy.

Figure 3:
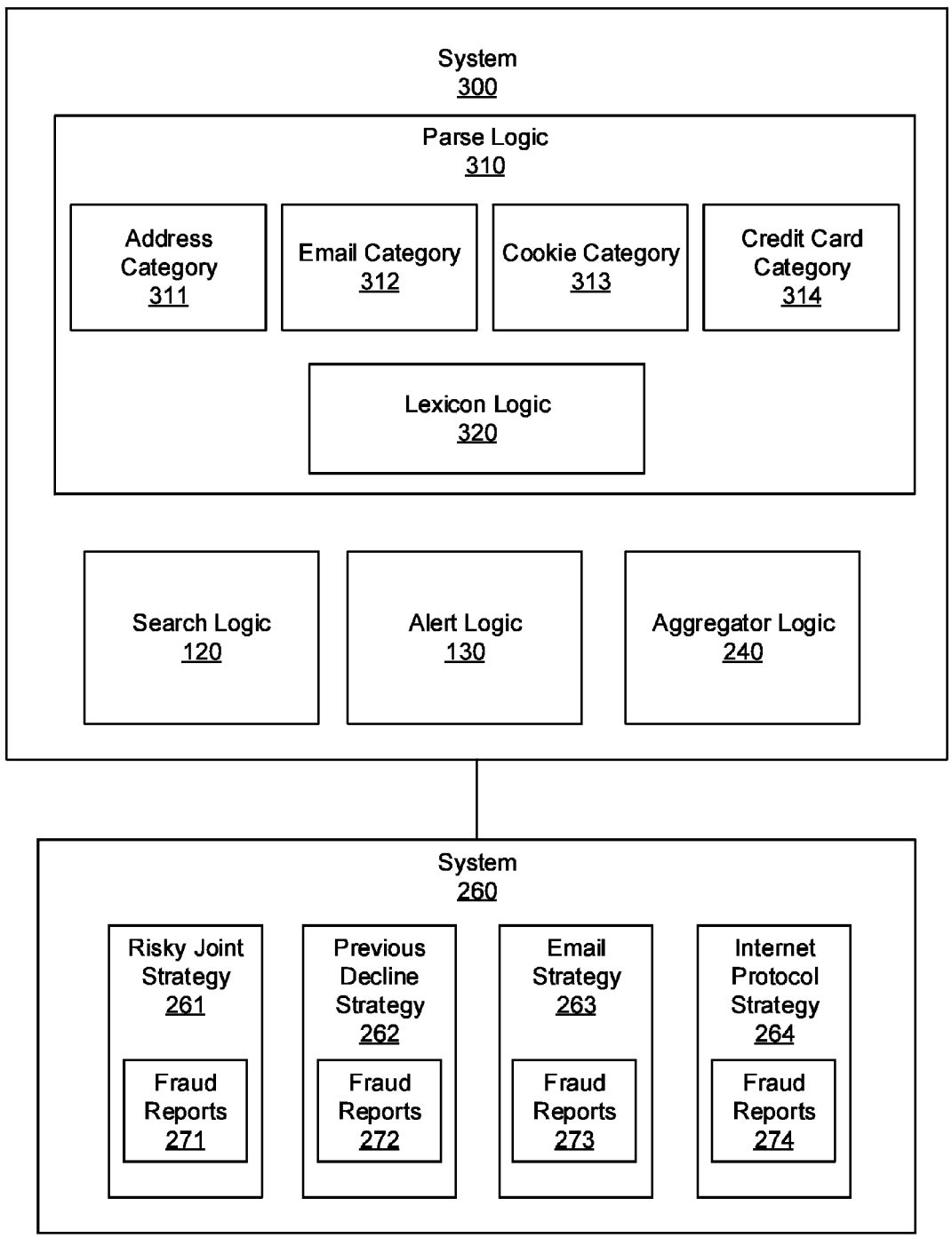
FIG. 3 illustrates another embodiment of a system having fraud detection strategy logics associated with automated secondary linking for fraud detection systems.

FIG. 3 is an illustration of an embodiment of a system 300 having a parse logic 310 associated with automated secondary linking for fraud detection systems. The parse logic 310 operates in a similar manner as the parse logic 110 described with respect to FIG. 1. Therefore, as discussed above in FIG. 1, the parse logic 310 parses the data received fraud reports to generate fraud data. In one embodiment, the parse logic 310 filters the data of the fraud reports into categories. For example, the parse logic 310 identifies addresses and filters the identified addresses into an address category 311.

The parse logic 310 may be configured to use a single method or a number of methods to identify specific types of data from fraud reports. For example, the parse logic 310 may identify addresses by utilizing XML tagging conventions or the like. Additionally or alternatively, the parse logic 310 may utilize optical character recognition technology to identify text that has the characteristics of an address, such as two capital letters followed by a multi-digit number.

The parse logic 310 may also use lexicons to identify information from the fraud reports. A lexicon logic 320 may be populated with fraud data that has been previously identified. For example, an address (e.g., 100 Fraud Ln.) may appear on a number of applications deemed fraudulent. Once that address is known to be associated with fraud, the address is added to the lexicon logic 320. Accordingly, as the parse logic 310 receives a fraud report, the parse logic 310 may access the lexicon logic 320 and search fraud reports for data from the lexicon logic 320. In this manner, the parse logic 310 may identify an address because the address was stored in the lexicon logic 320 as an address that is fraudulent.

The system 260 operates in a similar manner as the system 260 described above with respect to FIG. 2. Using the methods described with respect to FIG. 2, the parse logic 310 identifies data from the fraud reports 271-274 from the system 260 and parses the data into the categories 311-314. An email category 312 is also shown. For example, email addresses may be identified by the parse logic 310 in fraud reports by identifying text including the commercial at symbol, "@". Identified email address are parsed to the email category 312. The cookie category 313 may look for a specific cookie on the computer used to conduct online banking. For example, an institution may place a specific cookie in the browser of a computer being used to complete and online account application. Instances of the identified cookie are stored in the cookie category 313. The parse logic 310 may further identify sixteen digit numbers as credit card account numbers and store the sixteen digit number in the credit card category 314. The categories are used to separate the information in a fraud report into discrete units of fraud data that can be identified in other fraud reports.

While four categories are shown, more or fewer categories may be used. For example, the parse logic 310 may identify 10 digit numbers as phone numbers and store identified phone numbers in a phone category. The categories may also be hierarchically arranged. For example, as discussed above, the parse logic 310 may identify a sixteen digit number as a credit card number. The parsing logic 310 may use additional information in the fraud report to determine how the credit card is being used. For example, if the identified credit card number is used to fund an account, the credit card number may be stored in a funding credit card category. Alternatively, if the identified credit card number is being used to make a payment, the credit card may be stored in a credit card payment category. Thus, categories can be established based on the specific needs of the organization attempting to identify fraud. For example, financial institutions attempting to identify account fraud may establish categories for storing the fraud data about accounts. In this manner, an institution can specifically target the types of fraud that are the most likely to be perpetrated against it.

Figure 4:
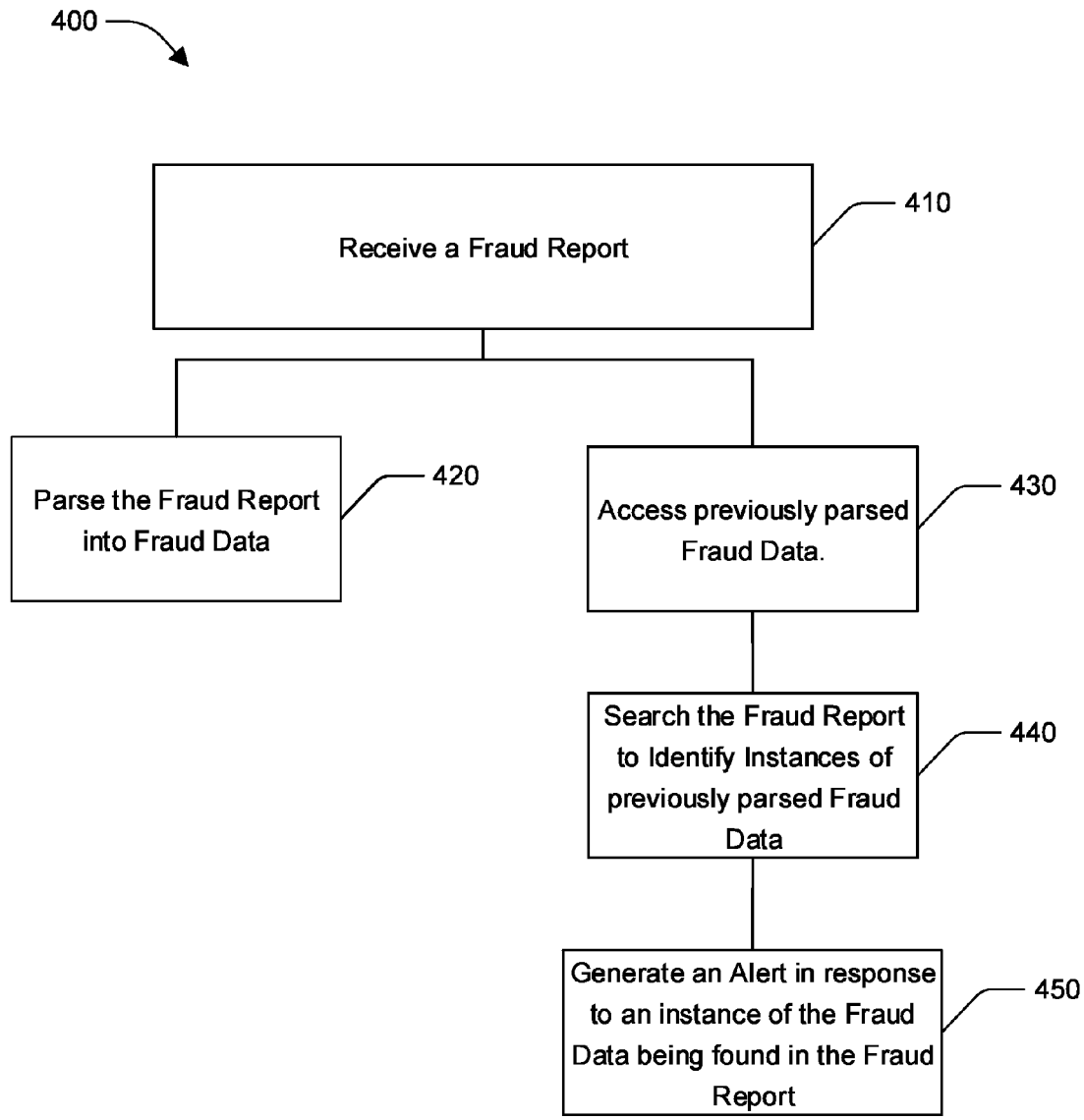
FIG. 4 illustrates one embodiment of a method associated with automated secondary linking for fraud detection systems.

FIG. 4 illustrates one embodiment of a method 400 associated with automated secondary linking for fraud detection systems previously described with respect to FIG. 1. At 410, an incoming fraud report is received. In one embodiment, fraud detection systems are queried for new fraud reports periodically, accordingly the fraud reports may be received in periodic batches. For example, if at the end of each business day fraud reports may be generated based on the fraud detection strategies, then at the end of each business day the fraud reports may be received. In another embodiment, fraud detection systems are configured to send a fraud report as the fraud report is generated in real time.

At 420, the received fraud report is parsed into fraud data. Parsing the information from the fraud reports includes identifying discrete amounts of data from the fraud report. The discrete amounts of data are then categorized into predetermined categories as fraud data. The fraud data may be categorized based on the format of the fraud data, XML tags embedded in the fraud report, optical character recognition, and so on.

In addition to a fraud report being parsed to generate fraud data, in one embodiment, the fraud report is also searched to identify instances of previously parsed fraud data. Therefore, at 430, previously parsed fraud data is accessed. At 440 the fraud report is searched to identify instances of the previously parsed fraud data. At 450, an alert is generated in response to an instance of the previously parsed fraud data being found in the fraud report. Accordingly, fraud reports are used in two ways. Firstly, fraud reports are parsed to identify new fraud data which is then stored. Secondly, the fraud reports are searched to determine if there are any instances of fraud data that was previously parsed from other fraud reports. This two prong process allows received fraud reports to be identified as containing fraud data from previous fraud reports as well as serving as the basis for finding fraud data in subsequent fraud reports. An alert may be generated for each identified instance of fraud data so that once an address is associated with fraud, each transaction using that address can be reviewed.

Figure 5:
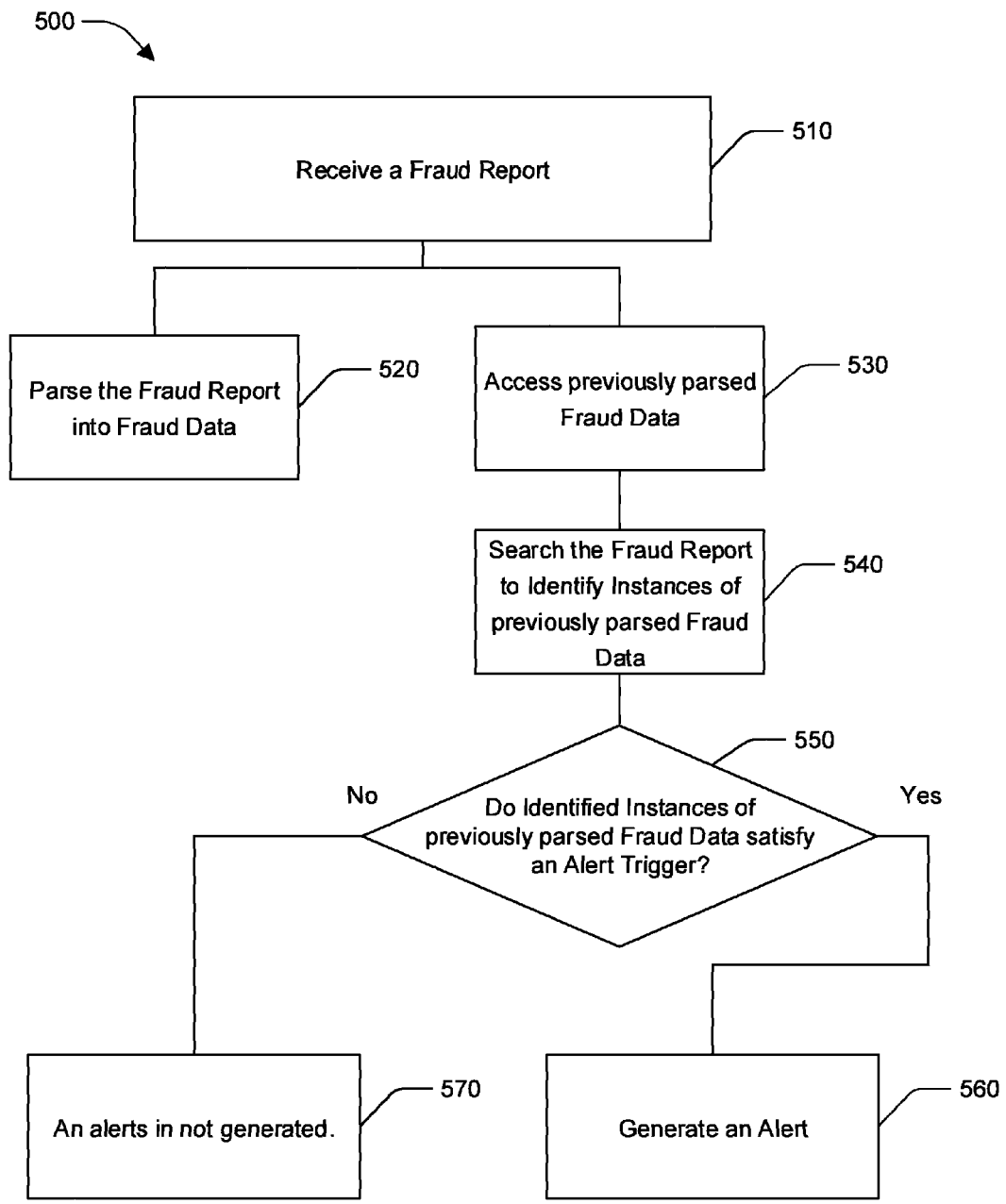
FIG. 5 illustrates one embodiment of a method associated with automated secondary linking for fraud detection systems employing an alert trigger.

FIG. 5 illustrates one embodiment of a method 500 associated with automated secondary linking for fraud detection systems employing an alert trigger. Steps 510, 520, 530, 540 and 560 operate in a similar manner as steps 410, 420, 430, 440, and 450, respectively, as described with respect to FIG. 4. Therefore, at 510, a fraud report is received. The fraud report is parsed into fraud data at 520. At 530, previously parsed fraud data is accessed, and at 540, the fraud report is searched to identify instances of previously parsed fraud data.

Rather than receiving an alert each time an instance of fraud data occurs in a fraud report, the alert may be subject to an alert trigger. For example, an alert trigger may be a number of instances of previously parsed fraud data being identified in the fraud report. Alternatively, an alert trigger may define a context of the fraud data, such as the instances of previously parsed fraud data occurring within a predetermined amount of time.

At 550, it is determined whether an identified instance of previously parsed fraud data satisfies an alert trigger. For example, an organization may wish to review applications if the previously parsed fraud data occurs multiple times in fraud reports or happens within a certain period of time of an event. As one example, a fraud alert may be generated if an address occurs if three or more applications when the applications are submitted within 48 hours of one another. If the alert trigger is determined to have been satisfied, an alert is generated at 560. Conversely, if it is determined that the alert trigger is not satisfied, an alert is not generated at 570. Therefore, the fraud data is used to generate an alert, not only when fraud data is identified in a fraud report, but also when activity is deemed suspicious. Furthermore, rather than alerts being generated regardless of the context of the instance of fraud data, alert triggers may be used to once a pattern of instances of fraud data has been identified in the fraud reports.

Figure 6:
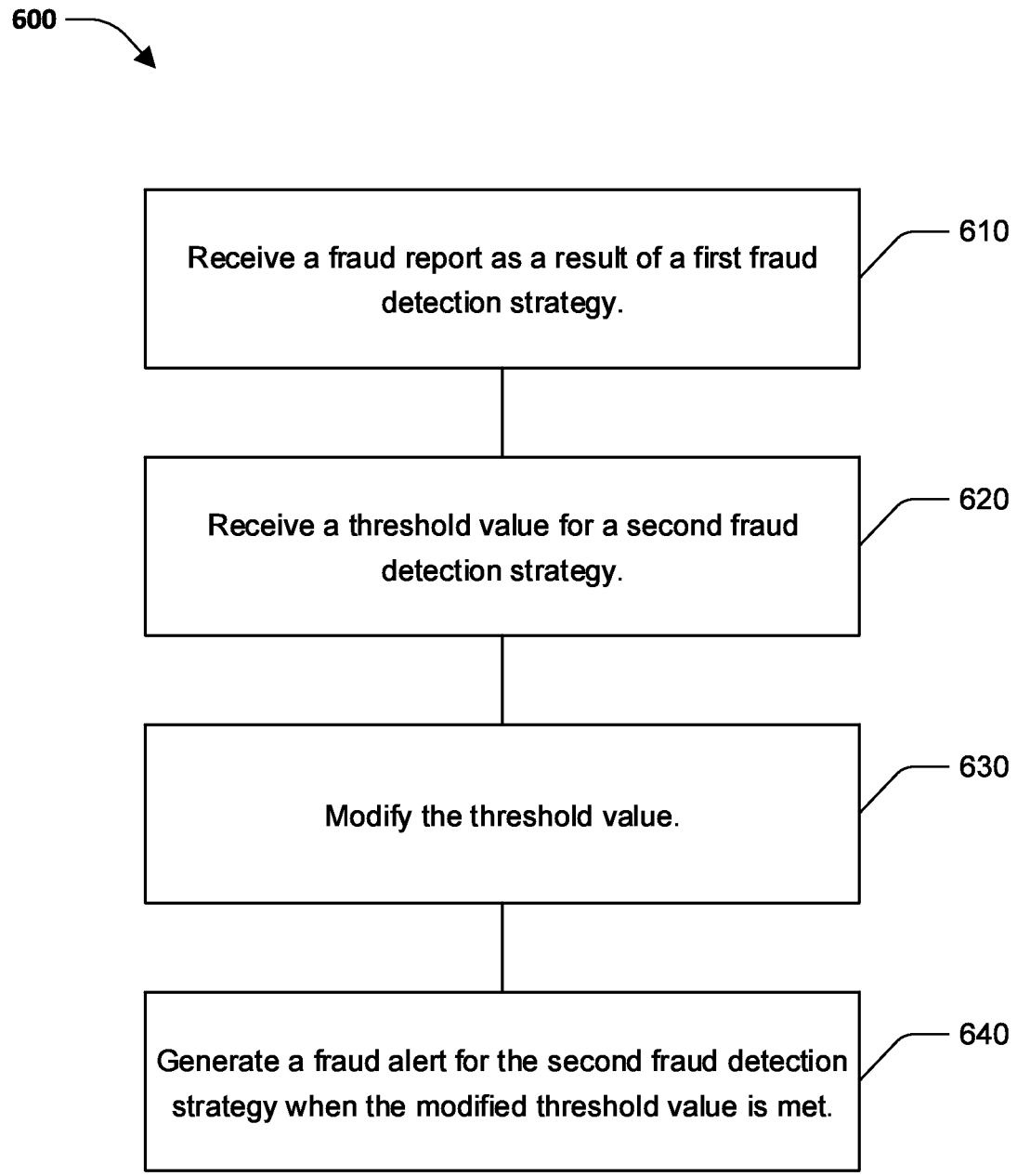
FIG. 6 illustrates one embodiment of a method associated with automated secondary linking for fraud detection systems employing threshold values.

FIG. 6 illustrates one embodiment of a method 600 associated with automated secondary linking of fraud detection systems employing threshold values. At 610 a fraud report is received as a result of a first fraud detection strategy. At 620 a threshold value for a second fraud detection strategy is received. As described above, in one embodiment, the second fraud detection strategy may be designed to generate a fraud report when an applicant for an account has been denied on three previous occasions. Accordingly, the threshold value for the second strategy would be three instances of an applicant being denied.

At 630, the threshold value of the second fraud detection strategy is modified. In one embodiment, the threshold value is modified based on a result of the first fraud detection strategy. For example, if an individual is identified in the fraud data parsed from a fraud report resulting from a first fraud detection strategy, the threshold value is modified such that a fraud report is generated when an applicant for an account has been denied on only two previous occasions. Thus, at 640, an alert is generated for the second fraud detection strategy when the modified threshold value is met.

Figure 7:
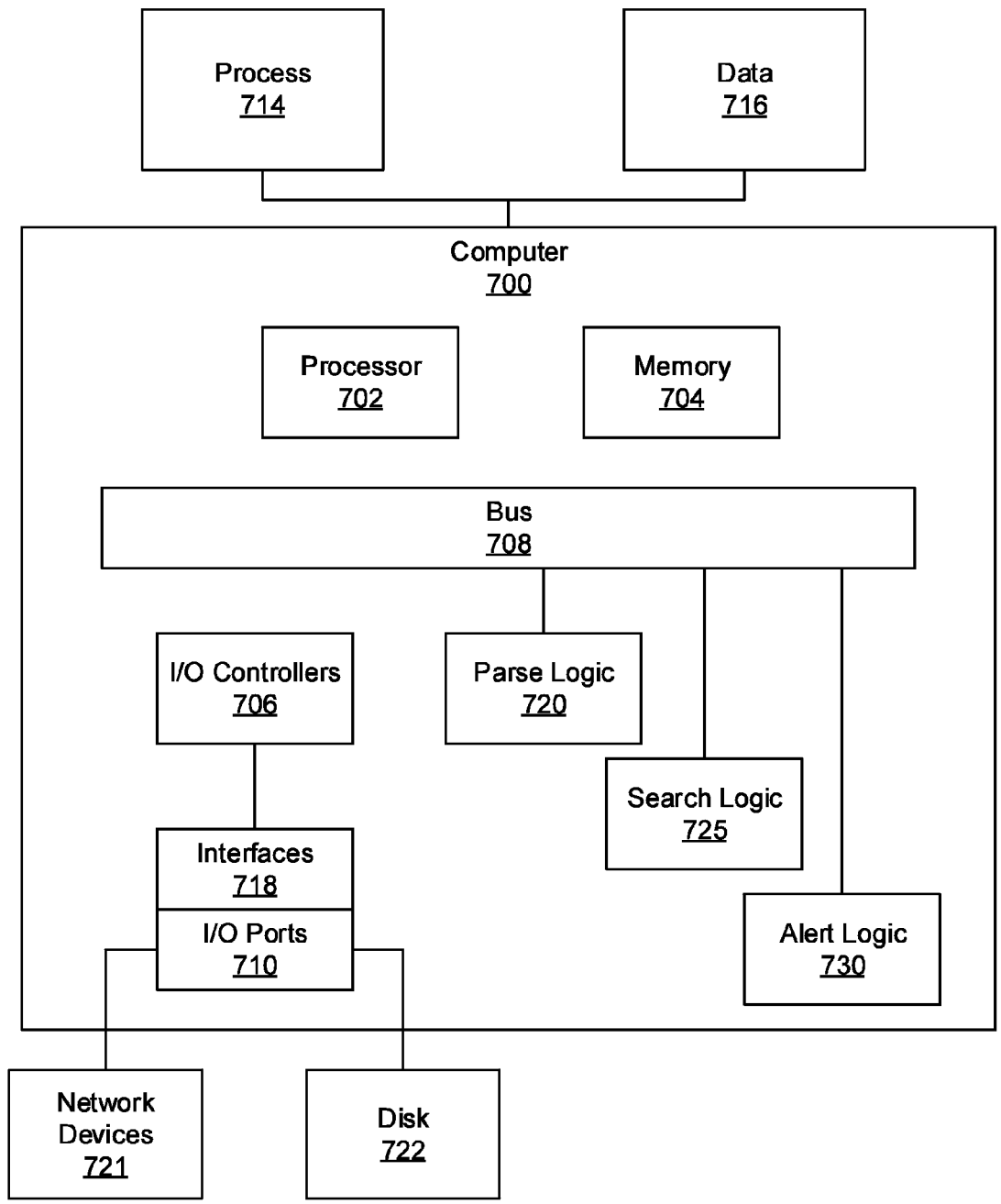
FIG. 7 illustrates one embodiment of an example computer environment associated with automated secondary linking for fraud detection systems.

FIG. 7 illustrates one embodiment of an example computer environment associated with automated secondary linking of fraud detection systems. The computer environment in which the systems and methods described herein, and equivalents, may operate may include a computer 700. The computer includes a processor 702, a memory 704, and input/output ports 706 operably connected by a bus 708. In one example, the computer 700 may include a parse logic 720, a search logic 725, and an alert logic 730. The parse logic is configured to parse information from a fraud report into categories in order to generate fraud data. The search logic 725 is configured to identify instances of the fraud data in fraud reports. The alert logic 730 is configured to generate an alert based on an instance of fraud data being identified in at least one of the fraud reports.

In different examples, the parse logic 720, the search logic 725, and the alert logic 730 may be implemented in hardware, a non-transitory computer-readable medium with stored instructions, firmware, and/or combinations thereof. While the parse logic 720, the search logic 725, and the alert logic 730 are illustrated as hardware components attached to the bus 708, it is to be appreciated that in one example, the parse logic 720, the search logic 725, and/or the alert logic 730 could be implemented in the processor 702. Moreover, the fraud data generated by the parse logic 720 may be stored in the memory 704. Unlike the embodiment shown in FIG. 1, here the memory 704 is external to the parse logic 720.

In one embodiment, parse logic 720 is a means (e.g., hardware, non-transitory computer-readable medium, firmware) for generating fraud data that can be used to detect fraud. The search logic 725 is a means (e.g., hardware, non-transitory computer-readable medium, firmware) for isolating instances of fraud data in other fraud reports. The alert logic 730 is a means (e.g., hardware, non-transitory computer-readable medium, firmware) for generating a fraud alert when an instance of the fraud data is isolated. The means may be implemented, for example, as an ASIC programmed to facilitate data editing in a web-based interactive web response system. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 722 may be operably connected to the computer 700 via, for example, an input/output interface (e.g., card, device) 718 and an input/output port 710. The disk 722 may be, for example, a magnetic disk drive, a solid state disk drive, a floppy disk drive, a tape drive, a Zip drive, a flash memory card, a memory stick, and so on. Furthermore, the disk 722 may be a CD-ROM drive, a CD-R drive, a CD-RW drive, a DVD ROM, and so on. The memory 704 can store a process 714 and/or a data 716, for example. The disk 722 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 706 and the input/output ports 710. Input/output devices may be, for example, a keyboard, a microphone, a pointing and selection device, cameras, video cards, displays, the network devices 721, the disk 722, and so on. The input/output ports 710 may include, for example, serial ports, parallel ports, and USB ports.

The computer 700 can operate in a network environment and thus may be connected to the network devices 721 via the i/o interfaces 706, and/or the i/o ports 710. Through the network devices 721, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a parsing logic configured to:
      receive an incoming fraud report based, at least in part, on a first fraud detection strategy; and
      parse the incoming fraud report into fraud data associated with the first fraud detection strategy;
   a threshold logic that sets a threshold value for the first fraud detection strategy and modifies the threshold value for a second fraud detection strategy;
   a search logic configured to search a set of fraud reports to identify secondary instances of the fraud data associated with the first fraud detection strategy, wherein the search logic includes the second fraud detection strategy with the modified threshold value that is dependent on the incoming fraud report; and
   an alert logic configured to generate an alert over a network in response to the second fraud detection strategy when the modified threshold value is met by secondary instances of the fraud data associated with the first fraud detection strategy being identified in the set of fraud reports,
   wherein the parsing logic, threshold logic, search logic, and alert logic are implemented in hardware.

2. The system of claim 1, wherein the fraud data includes at least one of information about the assets, entities, individuals, or organizations associated with a potential fraud.

3. The system of claim 1, wherein the parse logic is further configured to filter the fraud data into categories.

4. The system of claim 3, wherein the categories are hierarchically arranged.

5. The system of claim 1, further comprising an aggregator logic configured to:
   monitor a set of fraud detection strategies to identify the incoming fraud report;
   retrieve the incoming fraud report; and
   send the incoming fraud report to the parse logic.

6. The system of claim 1, wherein the alert logic is configured to generate the alert based, at least in part, on an alert trigger that defines a context of the fraud data.

7. The system of claim 6, wherein the context of the fraud data includes a number of instances of the fraud data occurring within a predetermined amount of time.

8. A method, comprising:
   receiving by a parsing logic a fraud report based, at least in part, on a first fraud detection strategy having a threshold value, wherein the fraud report includes primary instances of fraud data;
   modifying the threshold value for a second fraud detection strategy by a threshold logic based, at least in part, on the first fraud report;
   accessing previously parsed fraud data by the parsing logic;
   identifying by a search logic a secondary instance of the primary instances of fraud data from the fraud report in the previously parsed fraud data; and
   generating an alert by an alert logic in response to the second fraud detection strategy when the modified threshold value is met by identifying secondary instances of the primary instances of the fraud data, the alert is sent over a network,
   wherein the parsing logic, the threshold logic, the search logic, and the alert logic are implemented in hardware.

9. The method of claim 8, further comprising parsing information of the fraud report to generate the primary instances of fraud data.

10. The method of claim 9, further comprising:
identifying at least one primary instance of the fraud data in a subsequent fraud report; and
generating a new alert in response to identifying the at least one primary instance of the fraud data the subsequent fraud report.

11. The method of claim 8, further comprising determining whether the secondary instance of the fraud data satisfies an alert trigger, and wherein generating the alert is based, at least in part, on satisfying the alert trigger.

12. The method of claim 11, wherein the alert trigger is the threshold value of secondary instances of the fraud data occurring in the fraud report.

13. The method of claim 8, wherein the previously parsed fraud data is filtered into categories, and wherein the previously parsed fraud data is accessed from the categories.

14. The method of claim 13, wherein the categories are hierarchically arranged.

15. A non-transitory computer-readable medium storing computer-executable instructions that when executed by a computer cause the computer to perform a method, the method comprising:
receiving by a parsing logic a first fraud report as a result of a first fraud detection strategy wherein the fraud report includes primary instances of fraud data;
receiving by the parsing logic a second fraud report as the result of a second fraud detection strategy and a threshold value based, at least in part, on the second fraud detection strategy;
parsing by the parsing logic the first fraud report to generate fraud data, wherein the threshold value includes the fraud data;
modifying by a threshold logic the threshold value based, at least in part, on the first fraud report;
parsing by the parsing logic the second fraud report to generate fraud data, wherein satisfying the threshold value is based, at least in part, on the fraud data;
identifying by a searching logic secondary instances of the primary instances of fraud data from the fraud report in the parsed fraud data; and
generating by an alert logic a fraud alert for the second fraud report in response to the modified threshold being met by secondary instances of the primary instances of the fraud data, the alert is sent over a network,
wherein the parsing logic, threshold logic, search logic, and alert logic are implemented in hardware.

16. The non-transitory computer-readable medium of claim 15, further comprising storing the fraud data in categories.

17. The non-transitory computer-readable medium of claim 16, wherein the categories are arranged hierarchically.

18. The non-transitory computer-readable medium of claim 15, wherein the fraud data includes at least one of information about the assets, entities, individuals, or organizations associated with a potential fraud.

* * * * *